United States Patent
Kim

(10) Patent No.: US 12,189,474 B2
(45) Date of Patent: Jan. 7, 2025

(54) CONTROLLER AND OPERATING METHOD OF THE CONTROLLER FOR DETERMINING RELIABILITY DATA BASED ON SYNDROME WEIGHT

(71) Applicant: SK hynix Inc., Icheon (KR)

(72) Inventor: Dae Sung Kim, Icheon (KR)

(73) Assignee: SK hynix Inc., Icheon (KR)

( * ) Notice: Subject to any disclaimer, the term of this patent is extended or adjusted under 35 U.S.C. 154(b) by 134 days.

(21) Appl. No.: 17/936,790

(22) Filed: Sep. 29, 2022

(65) Prior Publication Data

US 2023/0289260 A1    Sep. 14, 2023

(30) Foreign Application Priority Data

Mar. 10, 2022 (KR) .......................... 10-2022-0029838

(51) Int. Cl.
*G06F 11/10*    (2006.01)

(52) U.S. Cl.
CPC ................................. *G06F 11/1044* (2013.01)

(58) Field of Classification Search
CPC ............ G06F 11/1008; G06F 11/1044; G06F 11/1072; G11C 29/52
See application file for complete search history.

(56) References Cited

U.S. PATENT DOCUMENTS

| 10,290,358 B2 | 5/2019 | Alhussien et al. |
| 10,789,124 B2* | 9/2020 | Chen .................... G06F 11/1012 |
| 2011/0096612 A1* | 4/2011 | Steiner ................ G11C 11/5642 365/189.09 |
| 2013/0163330 A1* | 6/2013 | Sharon ................ G06F 11/1072 365/185.17 |
| 2017/0148510 A1* | 5/2017 | Bazarsky ............ G11C 11/5642 |
| 2018/0012663 A1 | 1/2018 | Alhussien et al. |
| 2018/0173655 A1* | 6/2018 | Achtenberg ........ H03M 13/353 |
| 2018/0191391 A1* | 7/2018 | Kim ...................... G06F 1/1652 |
| 2019/0286516 A1* | 9/2019 | Jacobvitz ........... H03M 13/3746 |
| 2020/0373944 A1* | 11/2020 | Cho .................... G06F 11/1048 |
| 2021/0349778 A1* | 11/2021 | Sharon ............... H03M 13/1111 |

FOREIGN PATENT DOCUMENTS

KR    1020210019676 A    2/2021

* cited by examiner

*Primary Examiner* — Joseph O Schell

(57) ABSTRACT

A controller and an operating method of the controller may calculate a first syndrome weight which is syndrome weight for first read data, calculate a second syndrome weight which is syndrome weight for second read data, and determine first reliability data and second reliability data based on the first syndrome weight and the second syndrome weight. The first read data may be read from a memory area using a first read bias and the second read data may be read from the memory area using a second read bias different from the first read bias.

14 Claims, 14 Drawing Sheets

FIG.9
$W\_3 <= W\_1, \ W\_3 <= W\_2$
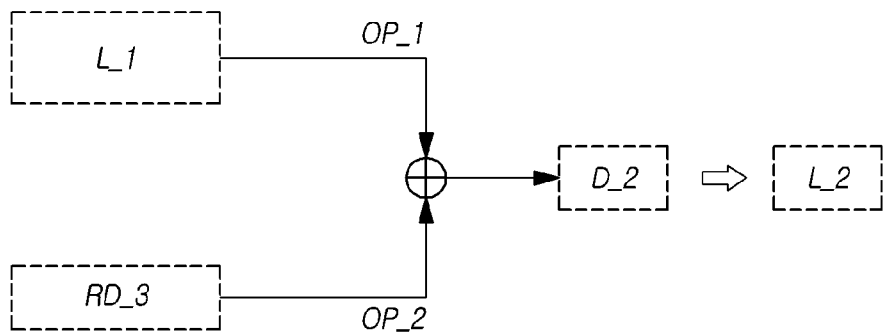

CONTROLLER AND OPERATING METHOD OF THE CONTROLLER FOR DETERMINING RELIABILITY DATA BASED ON SYNDROME WEIGHT

CROSS-REFERENCES TO RELATED APPLICATION

The present application claims priority under 35 U.S.C. 119(a) to Korean patent application number 10-2022-0029838 filed on Mar. 10, 2021, which are incorporated herein by reference in its entirety.

TECHNICAL FIELD

The embodiments of the present disclosure relate to a controller and operating method of the controller for determining reliability data based on syndrome weight.

BACKGROUND

A memory system includes a data storage device that stores data on the basis of a request from a host, such as a computer, servers, a smartphone, a tablet PC, or other electronic devices. Examples of a memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read, write, and/or erase operations on the memory devices in the memory system. The memory controller may execute firmware for performing a logical operation for controlling such operations.

When the memory system reads data from the memory device, an error bit may be included in the read data. The memory system may perform hard-decision decoding and soft-decision decoding to correct an error bit included in the read data. In general, the memory system may execute soft-decision decoding when hard-decision decoding fails.

SUMMARY

Embodiments of the present disclosure may provide a controller and operating method thereof, capable of executing more robust error correction using the hard-decision read data.

In one aspect, an embodiment of the present disclosure may provide a controller including i) a storage memory configured to store first reliability data and second reliability data ii) a decoder configured to decode data read from a memory area located outside the controller based on the first reliability data and the second reliability data and iii) a processing circuit configured to calculate a first syndrome weight, wherein the first syndrome weight is syndrome weight for first read data, wherein the first read data is hard-decision read data read from the memory area based on a first read bias, calculate a second syndrome weight, wherein the second syndrome weight is syndrome weight for second read data, wherein the second read data is hard-decision read data read from the memory area based on a second read bias and determine the first reliability data and the second reliability data based on the first syndrome weight and the second syndrome weight.

In another aspect, an embodiment of the present disclosure may provide an operating method of the controller including i) calculating a first syndrome weight, wherein the first syndrome weight is syndrome weight for first read data, wherein the first read data is hard-decision read data read from a memory area located outside the controller based on a first read bias ii) calculating a second syndrome weight, wherein the second syndrome weight is syndrome weight for second read data, wherein the second read data is hard-decision read data read from the memory area based on a second read bias iii) determining a first reliability data and a second reliability data based on the first syndrome weight and the second syndrome weight and iv) decoding data stored in the memory area based on the first reliability data and the second reliability data.

According to embodiments of the present disclosure, it is possible to execute more robust error correction using hard-decision read data.

BRIEF DESCRIPTION OF THE DRAWINGS

FIG. 9 to FIG. 12 illustrate an example of an operation in which the controller determines the first reliability data and the second reliability data again according to embodiments of the present disclosure.

DETAIL DESCRIPTION OF THE EXEMPLARY EMBODIMENTS

Figure 1:
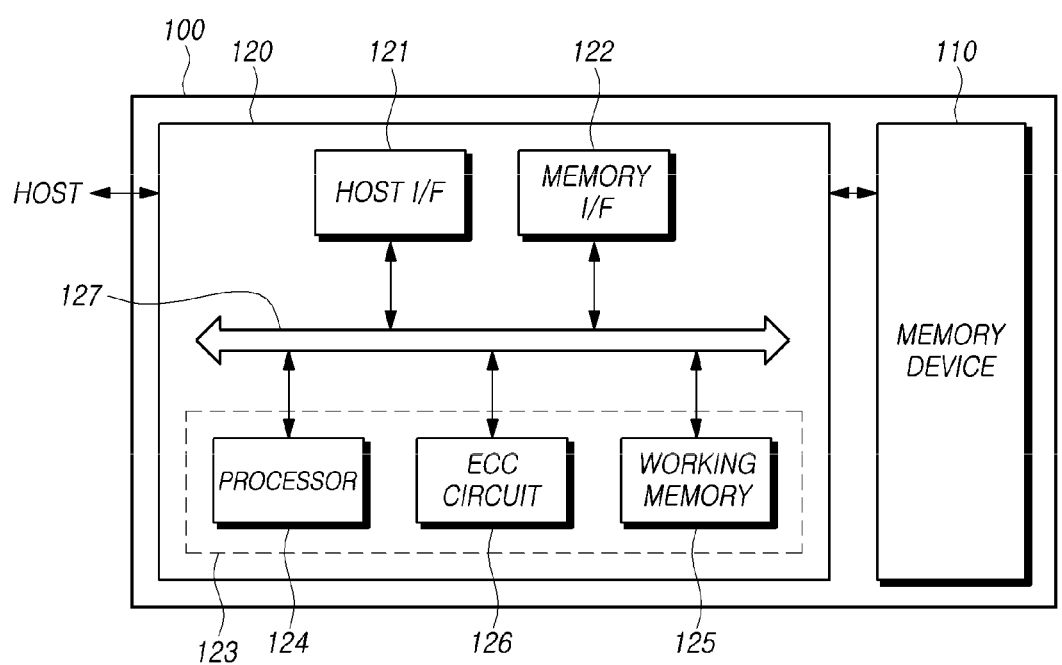
FIG. 1 is a schematic diagram illustrating a memory system according to embodiments of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 according to embodiments of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased on a block-by-block basis.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. In addition, the memory controller 120 may control the operation of the memory device 110 even in the absence of a request from the host such as when performing background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

Firmware may refer to a program or software stored on a nonvolatile memory and executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, volatile memory such as at least one among a static RAM (SRAM), a dynamic RAM (DRAM), and a synchronous RAM (SDRAM).

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
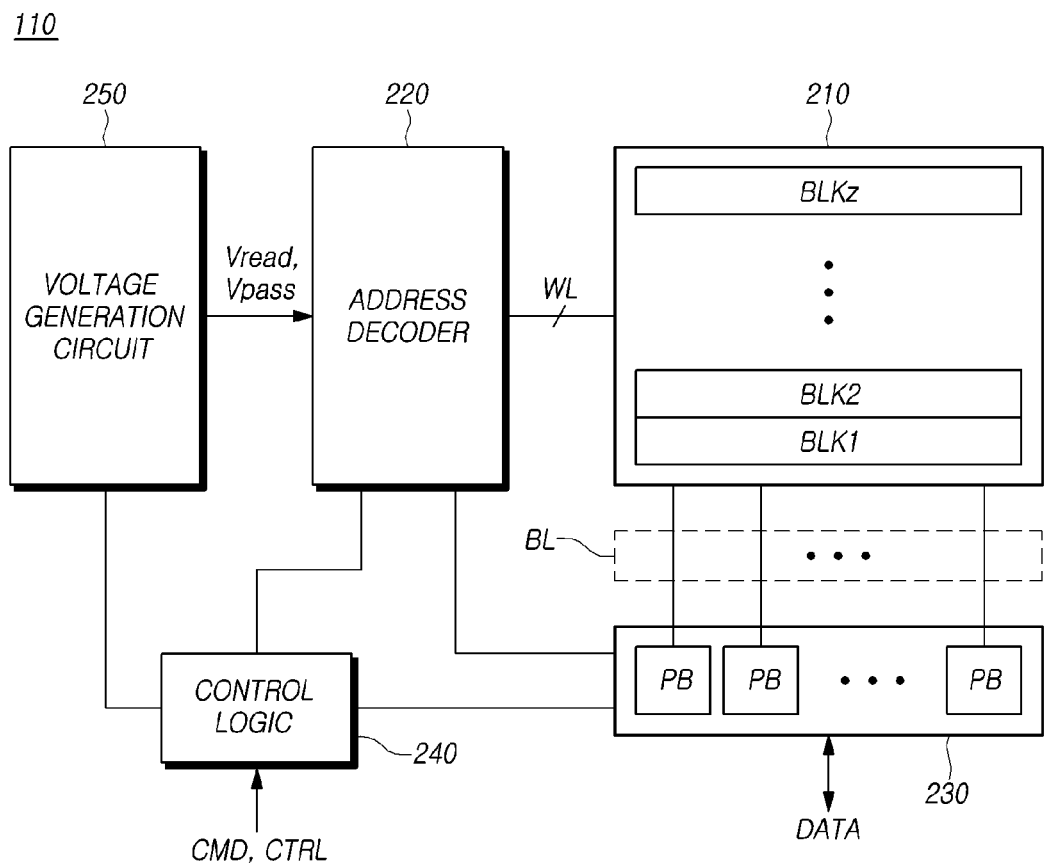
FIG. 2 is a block diagram schematically illustrating a memory device according to embodiments of the disclosed technology.

FIG. 2 is a block diagram schematically illustrating a memory device 110 according to embodiments of the disclosed technology.

In some implementations, the memory device 110 based on an embodiment of the disclosed technology may include a memory cell array 210, an address decoder 220, a read/write circuit 230, control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells may be nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
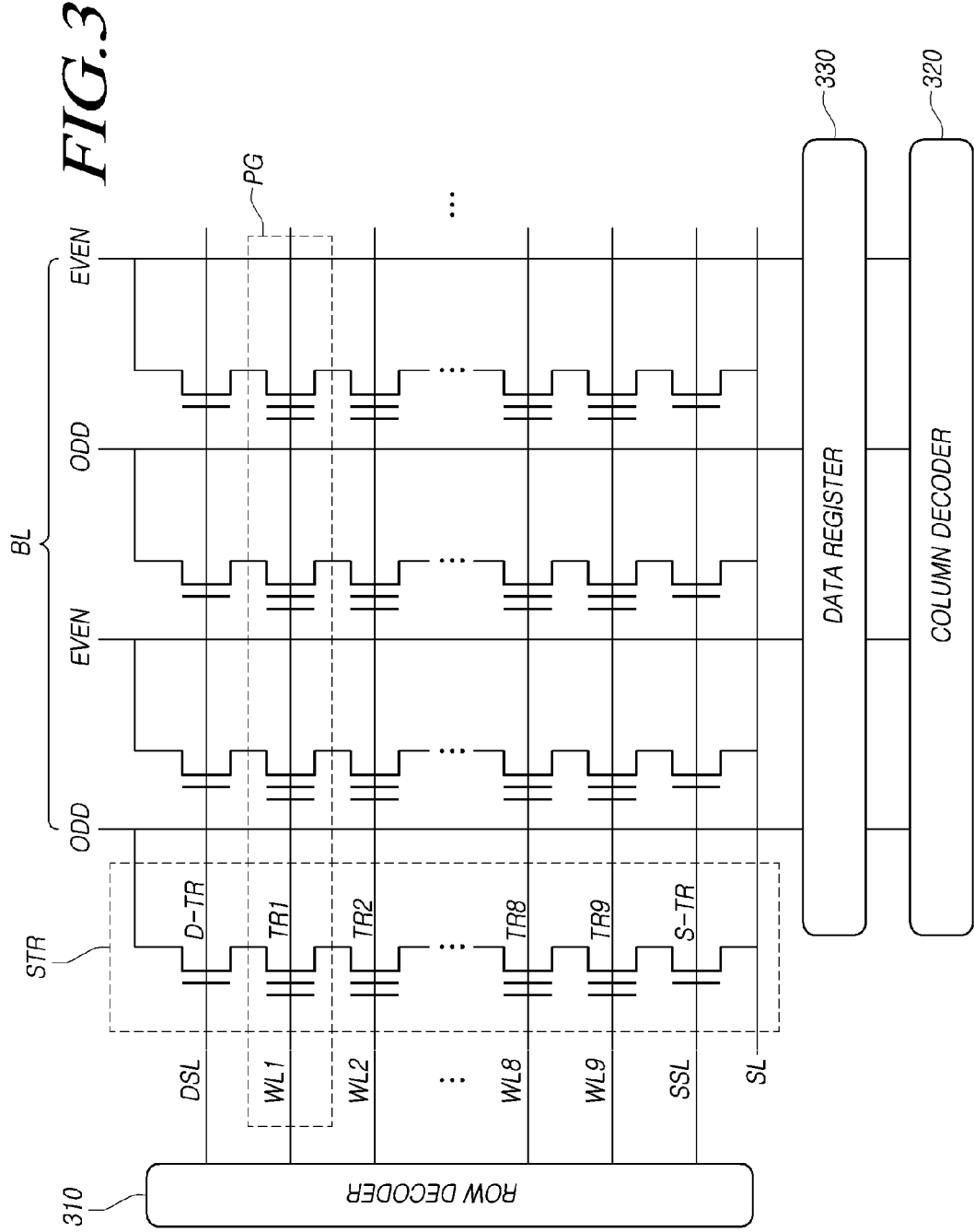
FIG. 3 illustrates a structure of word lines and bit lines of a memory device according to embodiments of the disclosed technology.

FIG. 3 is a diagram illustrating a structure of word lines WL and bit lines BL of a memory device 110 according to embodiments of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called a "page" PG, and a certain number of memory cells that are coupled in series can be called a "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on and off by the first selection line DSL, has a gate electrode connected to the first selection line DSL, but includes no floating gate FG. The second selection transistor S-TR, which is controlled to turn on and off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first and second selection transistors D-TR and S-TR to respectively turn on the first and second selection transistor D-TR and S-TR, and applies a predetermined turn-off voltage (e.g., 0V) to the gate electrode of the first and second selection transistor D-TR and S-TR to respectively turn off the first and second selection transistor D-TR and S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
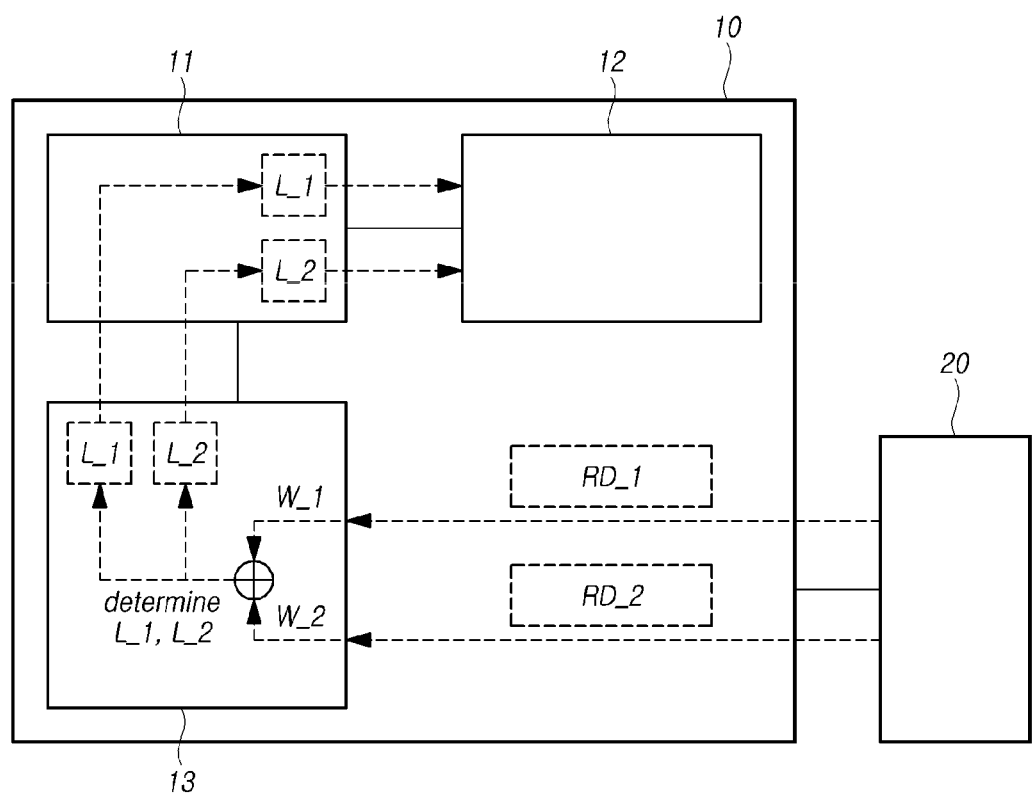
FIG. 4 schematically illustrates an example of an operation of the controller according to embodiments of the present disclosure.

FIG. 4 schematically illustrates an example of operation of the controller 10 according to embodiments of the present disclosure.

Referring to FIG. 4, the controller 10 may include a storage memory 11, a decoder 12 and a processing circuit 13.

The storage memory 11 may store first reliability data L_1 and second reliability data L_2. The first reliability data L_1 and the second reliability data L_2 may be data of one or more bits. In this case, the sizes of the first reliability data L_1 and the second reliability data L_2 may be the same.

The decoder 12 may decode data read from a memory area 20 based on the first reliability data L_1 and the second reliability data L_2.

The memory area 20 may be located outside the controller 10 and may store data. One or more bits of data may be stored in the memory area 20 and the controller 10 may read data stored in the memory area 20.

The decoder 12 may perform decoding according to a preset algorithm using the first reliability data L_1 and the second reliability data L_2.

For example, the decoder 12 may input the first reliability data L_1 and the second reliability data L_2 to a preset error function. The decoder 12 may then determine whether to execute a flip operation on the K-th bit (K being an integer greater than or equal to 0) of the first reliability data L_1 based on the outputted result of the error function.

For example, the error function may output a result value proportional to an error probability of the K-th bit of the first reliability data L_1. The error function may output a first result value if the K-th bit of the first reliability data L_1 is 1, and output a second result value if it is 0. As the result value output from the error function increases, the error probability of the K-th bit of the first reliability data L_1 increases.

The decoder 12 may perform a flip operation on the K-th bit of the first reliability data L_1 when the error probability for the K-th bit of the first reliability data L_1 is greater than or equal to a preset first result value.

If the error probability for the K-th bit of the first reliability data L_1 is less than a first threshold error probability and greater than or equal to a second threshold error probability (the second threshold error probability being greater than the first threshold error probability), the decoder 12 may determine whether to perform a flip operation on the K-th bit of the first reliability data L_1 based on the reliability of the K-th bit of the first reliability data L_1.

For example, when the reliability of the K-th bit of the first reliability data L_1 is less than a threshold reliability (that is, when reliability is weak), the decoder 12 may perform a flip operation on the K-th bit of the first reliability data L_1.

On the other hand, when the reliability of the K-th bit of the first reliability data L_1 is greater than or equal to the threshold reliability (that is, when reliability is strong), the decoder 12 may not perform a flip operation on the K-th bit of the first reliability data. In this case, the decoder 12 changing the first reliability data L_1 would result in the reliability of the K-th bit of the first reliability data L_1 being less than the threshold reliability.

The processing circuit 13 may calculate a first syndrome weight W_1, which is syndrome weight for first read data RD_1, where the first read data RD_1 is hard-decision read data read from the memory area 20 based on a first read bias. In an embodiment, a read bias corresponds to a value of a read voltage Vread applied to a word line corresponding to the data being read during the reading of that data.

The processing circuit 13 may also calculate a second syndrome weight W_2, which is syndrome weight for second read data RD_2, where the second read data RD_2 is hard-decision read data read from the memory area 20 based on a second read bias. The second read data RD_2 is read from the same memory cells of the memory area 20 as the first read data RD_1.

Hard-decision read data means read data whose reliability is not evaluated through an additional read. For example, when a specific read bias is applied to a word line of a memory cell included in the memory region 20, data stored in that memory cell may be read as a specific value (e.g., 1 or 0) according to on/off state of the memory cell and the read bias. When the reliability of data read from the corresponding memory cell is not evaluated later, the data is hard-decision read data.

And hard decision decoding means decoding using only the above-described hard-decision read data.

When different read biases are applied to a word line of the same memory cell, data read from the corresponding memory cell may be different. Accordingly, when the first read bias and the second read bias are different, the first read data RD_1 and the second read data RD_2 may also be different.

Meanwhile, information on the positional correlation between the first read bias and the second read bias may not be given. In this case, it is difficult to determine the reliability of data read from the memory area 20 by simply comparing the first read data RD_1 and the second read data RD_2.

Therefore, in the embodiments of the present disclosure, in order to secure reliability information on the data read from the memory area 20 even in this case, the processing circuit 13 of the controller 10 may calculate respective syndrome weights for the first read data RD_1 and the second read data RD_2 that are hard-decision read data, and use the calculated syndrome weights to determine reliability data for data read from the memory area 20. Through this, the processing circuit 13 may perform robust error correction based on the hard decision read data read from the memory area 20.

The syndrome weight for the hard-decision read data may be determined as the number of syndrome elements having a preset value (e.g. 1) among syndrome elements included in the syndrome corresponding to the hard-decision read data.

For example, the processing circuit 13 may generate a data chunk vector r based on a data chunk including the hard-decision read data described above. If the data chunk is N bits (where N is a natural number), the data chunk vector r may have N data chunk elements.

The processing circuit 13 may generate a syndrome $S = H*r$ by performing a multiplication operation on a preset parity check matrix H and the aforementioned data chunk vector r. In this case, the hard-decision read data may be used to calculate syndrome elements in the syndrome.

The processing circuit 13 may determine the number of syndrome elements having a preset value among the syndrome elements in the aforementioned syndrome as a syndrome weight for the hard-decision read data. For example, in an illustrative embodiment wherein a syndrome element having a value of 1 indicates that the corresponding bit of the read data is in error, the syndrome weight of a syndrome of the read data may correspond to the number of syndrome elements in the syndrome having a value of 1. The processing circuit 13 may determine that as the value of the syndrome weight for the hard-decision read data increases, the probability of an error occurring in the hard-decision read data increases.

The processing circuit 13 may determine the first reliability data L_1 and the second reliability data L_2 based on the first syndrome weight W_1 and the second syndrome weight W_2.

The first reliability data L_1 and the second reliability data L_2 determined by the processing circuit 13 may be stored in the storage memory 11. As described above, the first reliability data L_1 and the second reliability data L_2 stored in the storage memory 11 may be used when the decoder 12 performs decoding on the data read from the memory area 20.

Meanwhile, the above-described controller 10 and the storage memory 11, the decoder 12, and the processing circuit 13 in the controller 10 may be implemented in various ways.

For example, the controller 10 may be the memory controller 120 illustrated in FIG. 1. In this case, the storage memory 11 may be a working memory 125 in the memory controller 120 or a separate volatile memory (e.g. SRAM, DRAM, register). The decoder 12 may be the error detection/correction circuit 126 in the memory controller 120. The processing circuit 13 may be the processor 124 in the memory controller 120.

For example, the controller 10 may be a separate computing device (e.g. embedded system, smartphone, desktop, laptop). In this case, the storage memory 11 may be a volatile memory (e.g. SRAM, DRAM, register) in the corresponding computing device. The decoder 12 may be a decoding module in the corresponding computing device. In addition, the processing circuit 13 may be a microprocessor, CPU, or System-on-a-Chip (SoC) included in the corresponding computing device.

In addition, the above-described memory area 20 may also be implemented in various ways. For example, the memory area 20 may be a part of the memory device 110 illustrated in FIG. 1. For example, the memory area 20 may be one or more memory cells included in the memory device 110.

Figure 5:
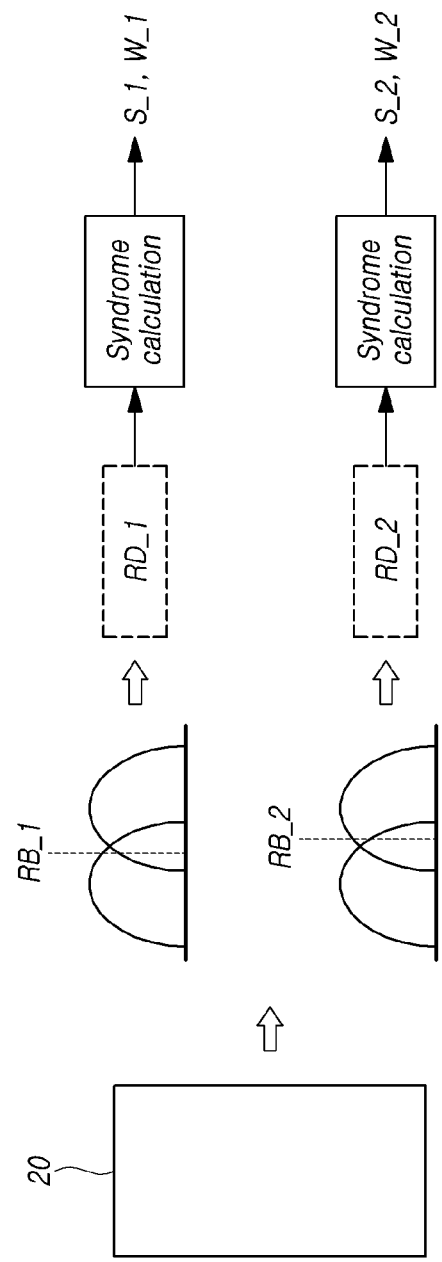
FIG. 5 illustrates an example of an operation in which the controller calculates the first syndrome weight and the second syndrome weight according to embodiments of the present disclosure.

FIG. 5 illustrates an example of an operation in which the controller 10 calculates the first syndrome weight W_1 and the second syndrome weight W_2 according to embodiments of the present disclosure.

Referring to FIG. 5, the processing circuit 13 of the controller 10 may first read the first read data RD_1 and the second read data RD_2.

The first read data RD_1 is a result of reading data stored in the memory area 20 based on the first read bias RB_1. The second read data RD_2 is a result of reading data stored in the memory area 20 based on the second read bias RB_2.

In this case, the second read bias RB_2 is different from the first read bias RB_1. Since the second read bias RB_2 and the first read bias RB_1 are different from each other, the first read data RD_1 and the second read data RD_2 may be different from each other even though both are read from the same memory region 20, that is, from the same memory cells.

Meanwhile, in FIG. 5, only two threshold voltage distributions are illustrated taking the case where one bit is stored in one memory cell in the memory area 20 as an example, but embodiments of the present disclosure are not limited thereto. That is, when Q (Q is a natural number equal to or great than 2) bits are stored in a memory cell, $2^Q$ threshold voltage distributions may be generated. In the case of MLC, TLC, and QLC, 4, 8, and 16 threshold voltage distributions may be generated, respectively.

The processing circuit 13 may calculate a first syndrome S_1 that is a syndrome with respect to the first read data RD_1, and calculate a first syndrome weight W_1 that is a weight of the first syndrome S_1 based on the calculated first syndrome S_1. The processing circuit 13 may further calculate a second syndrome S_2 that is a syndrome for the second read data RD_2, and calculate a second syndrome weight W_2 that is a weight of the second syndrome S_2 based on the calculated second syndrome S_2.

Hereinafter, an operation in which the controller 10 determines the first reliability data L_1 and the second reliability data L_2 based on the above-described first syndrome weight W_1 and the second syndrome weight W_2 is disclosed.

Figure 6:
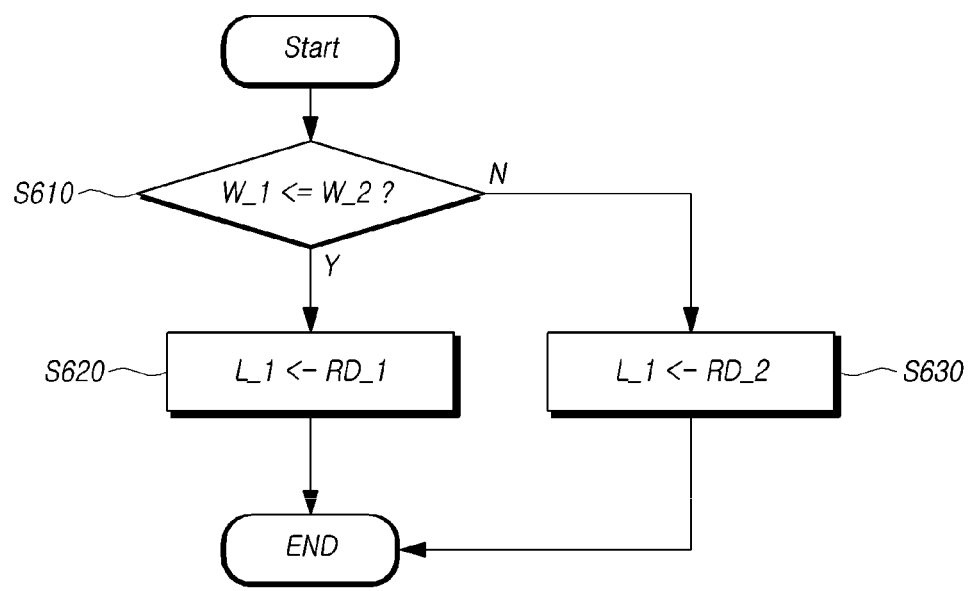
FIG. 6 illustrates an example of an operation in which the controller determines the first reliability data according to embodiments of the present disclosure.

FIG. 6 illustrates an example of an operation in which the controller 10 determines the first reliability data L_1 according to embodiments of the present disclosure.

Referring to FIG. 6, the processing circuit 13 of the controller 10 determines whether the first syndrome weight W_1 is equal to or less than the second syndrome weight W_2 (S610).

When the first syndrome weight W_1 is equal to or less than the second syndrome weight W_2 (S610-Y), the processing circuit 13 may select the first read data RD_1 to be the first reliability data L_1 (S620).

On the other hand, when the first syndrome weight W_1 is greater than the second syndrome weight W_2 (S610-N), the processing circuit 13 may select the second read data RD_2 to be the first reliability data L_1 (S630).

Figure 7:
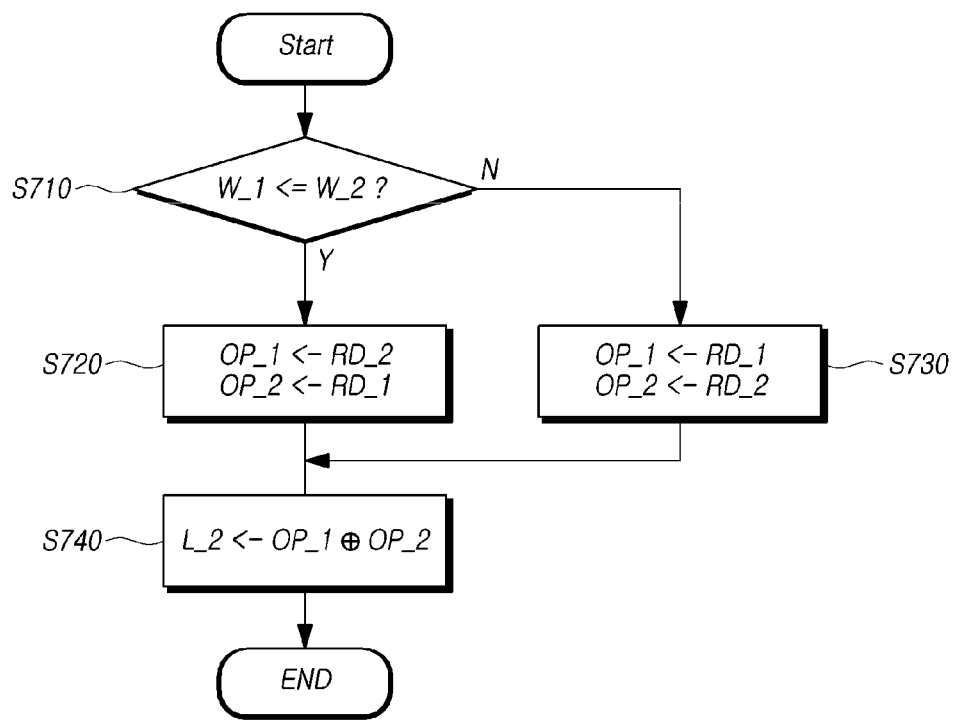
FIG. 7 illustrates an example of an operation in which the controller determines the second reliability data according to embodiments of the present disclosure.

FIG. 7 illustrates an example of an operation in which the controller 10 determines the second reliability data L_2 according to embodiments of the present disclosure.

Referring to FIG. 7, the processing circuit 13 of the controller 10 determines whether the first syndrome weight W_1 is equal to or less than the second syndrome weight W_2 (S710).

When the first syndrome weight W_1 is equal to or less than the second syndrome weight W_2 (S710-Y), the processing circuit 13 may select the second read data RD_2 to be a first operand OP_1 and select the first read data RD_1 to be a second operand OP_2 (S720). The first operand OP_1 and the second operand OP_2 are operands to be used in a target operation, which will be described later.

On the other hand, when first syndrome weight W_1 is greater than the second syndrome weight (S710-N), the processing circuit 13 may select the first read data RD_1 to be the first operand OP_1 and select the second read data RD_2 to be the second operand OP_2 (S730).

After the operation S720 or S730 is executed, the processing circuit 13 may determine the second reliability data L_2 as a result of executing a preset target operation $\oplus$ on the first operand OP_1 and the second operand OP_2 (S740).

The target operation $\oplus$ may vary according to embodiments.

For example, in an embodiment, the target operation ⊕ may be an operation generating a first reliability value when the first operand OP_1 is equal to the second operand OP_2 and generating a second reliability value when the first operand OP_1 is not equal to the second operand OP_2. In this case, the first reliability value indicates higher reliability than the second reliability value. That is, the target operation ⊕ may be an operation that generates a value indicating strong reliability when two input values match each other and generates a value indicating weak reliability when two input values do not match each other.

Figure 8:
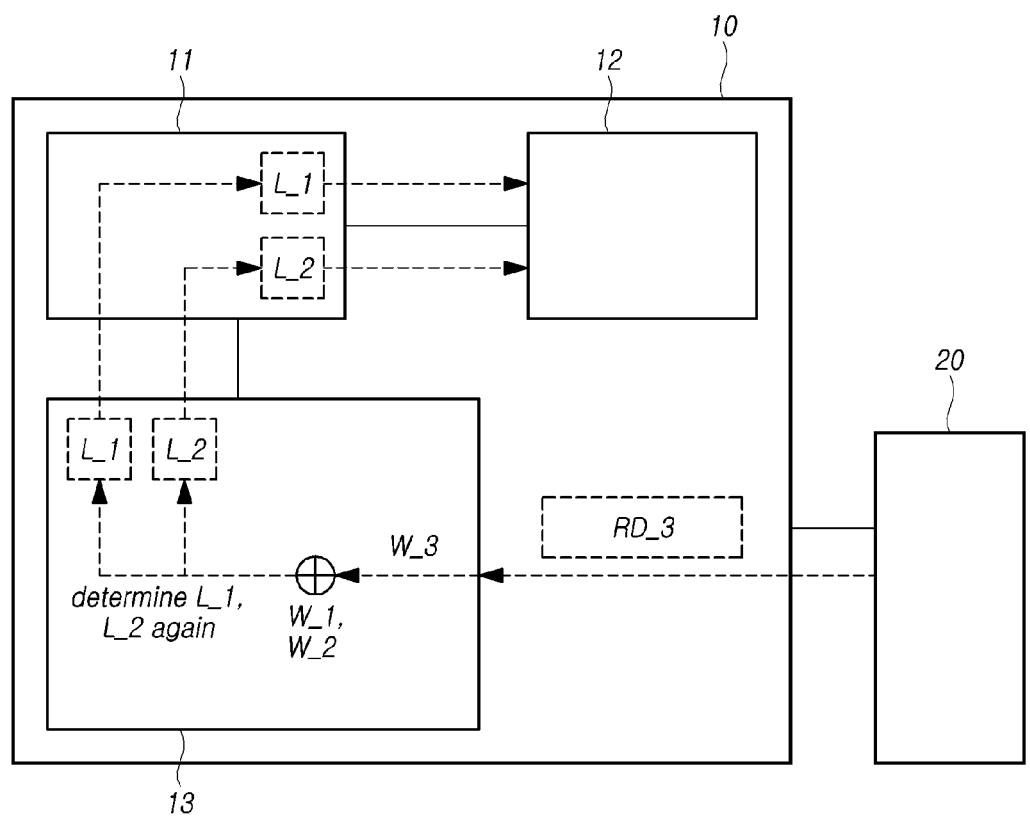
FIG. 8 schematically illustrates another example of an operation of the controller according to embodiments of the present disclosure.

In another embodiment, the target operation @ may be an operation wherein (for K an integer greater than or equal to 0) when the K-th bit of the first operand OP_1 is equal to the K-th bit of the second operand OP_2, the K-th bit of the result of the target operation indicates the first reliability value, and when the K-th bit of the first operand OP_1 is not equal to the K-th bit of the second operand OP_2, the K-th bit of the result of the target operation indicates the second reliability value, wherein the first reliability value indicates higher reliability than the second reliability value FIG. 8 schematically illustrates another example of operation of the controller 10 according to embodiments of the present disclosure. In embodiments, the operation illustrated by FIG. 8 is performed after the operation illustrated by FIG. 4.

Referring to FIG. 8, the processing circuit 13 of the controller 10 may calculate a third syndrome weight W_3, which is syndrome weight for third read data RD_3, wherein the third read data RD_3 is hard-decision read data read from the memory area 20 based on a third read bias. The value of the third read bias may be different than the values of the first and second read biases.

The processing circuit 13 may re-determine the first reliability data L_1 and the second reliability data L_2 based on the first syndrome weight W_1, the second syndrome weight W_2 and the third syndrome weight W_3.

When the processing circuit 13 re-determines the first reliability data L_1 and the second reliability data L_2, each of the first reliability data L_1 and the second reliability data L_2 may be maintained unchanged or may be updated.

FIG. 9 to FIG. 12 illustrate an example of an operation in which the controller 10 determines the first reliability data L_1 and the second reliability data L_2 again according to embodiments of the present disclosure.

Referring to FIG. 9, when the third syndrome weight W_3 is less than or equal to the first syndrome weight W_1 and the second syndrome weight W_2, the processing circuit 13 of the controller 10 may determine the first reliability data L_1 and the second reliability data L_2 as follows.

First, the processing circuit 13 may select the third read data RD_3 to be first data D_1.

The processing circuit 13 may also select the first reliability data L_1 to be the first operand OP_1.

The processing circuit 13 may also select the third read data RD_3 to be the second operand OP_2.

The processing circuit 13 may then determine second data D_2 as being a result of executing the target operation @ on the first operand OP_1 and the second operand OP_2.

The processing circuit 13 may then update the first reliability data L_1 to be the first data D_1 and update the second reliability data L_2 to be the second data D_2.

Figure 10:
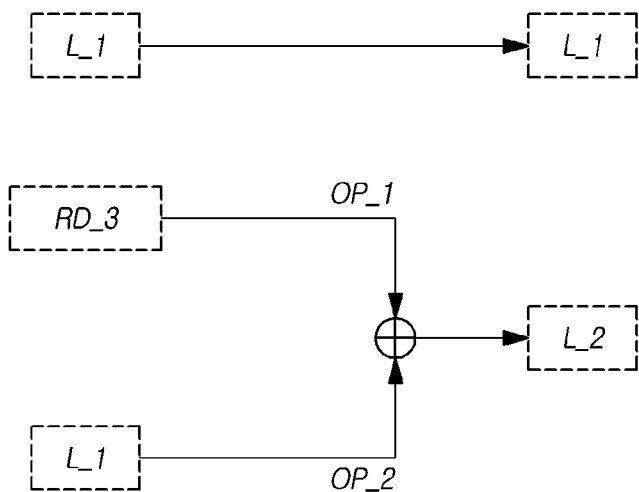

Referring to FIG. 10, when the third syndrome weight W_3 is less than or equal to a maximum value of the first syndrome weight W_1 and the second syndrome weight W_2 and is greater than a minimum value of the first syndrome weight W_1 and the second syndrome weight W_2, the processing circuit 13 of the controller 10 may determine the first reliability data L_1 and the second reliability data L_2 as follows.

First, the processing circuit 13 may maintain the first reliability data L_1 unchanged.

The processing circuit 13 may also select the third read data RD_3 to be the first operand OP_1.

The processing circuit 13 may also select the first reliability data L_1 to be the second operand OP_2.

The processing circuit 13 may then update the second reliability data L_2 as being a result of executing the target operation ⊕ on the first operand OP_1 and the second operand OP_2.

Figure 11:
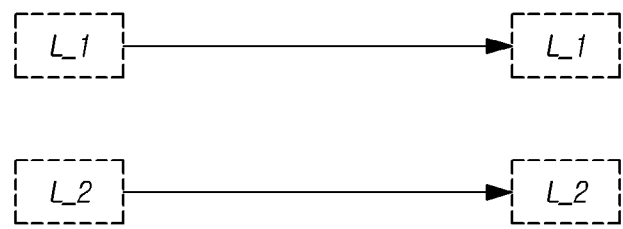

Referring to FIG. 11, wherein when the third syndrome weight W_3 is greater than the first syndrome weight W_1 and the second syndrome weight W_2, the processing circuit 13 of the controller 10 may determine the first reliability data L_1 and the second reliability data L_2 as follows.

First, the processing circuit 13 may maintain the first reliability data L_1 unchanged.

The processing circuit 13 may also maintain the second reliability data L_2 unchanged.

Figure 12:
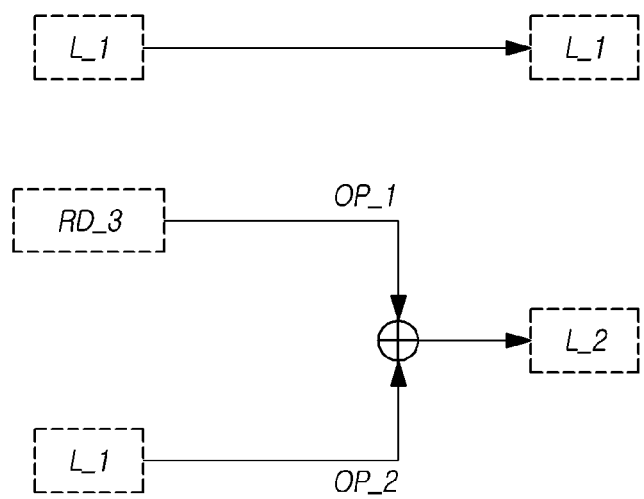

Referring to FIG. 12, when the third syndrome weight W_3 is greater than the first syndrome weight W_1 and the second syndrome weight W_2 and difference between the third syndrome weight W_3 and the maximum value of the first syndrome weight W_1 and the second syndrome weight W_2 is less than a preset threshold difference value, the processing circuit 13 of the controller 10 may determine the first reliability data L_1 and the second reliability data L_2 as follows.

First, the processing circuit 13 may maintain the first reliability data L_1 unchanged.

And the processing circuit 13 may select the third read data RD_3 to be the first operand OP_1.

And the processing circuit 13 may select the first reliability data L_1 to be the second operand OP_2.

And the processing circuit 13 may update the second reliability data L_2 as being a result of executing the target operation ⊕ on the first operand OP_1 and the second operand OP_2.

Figure 13:
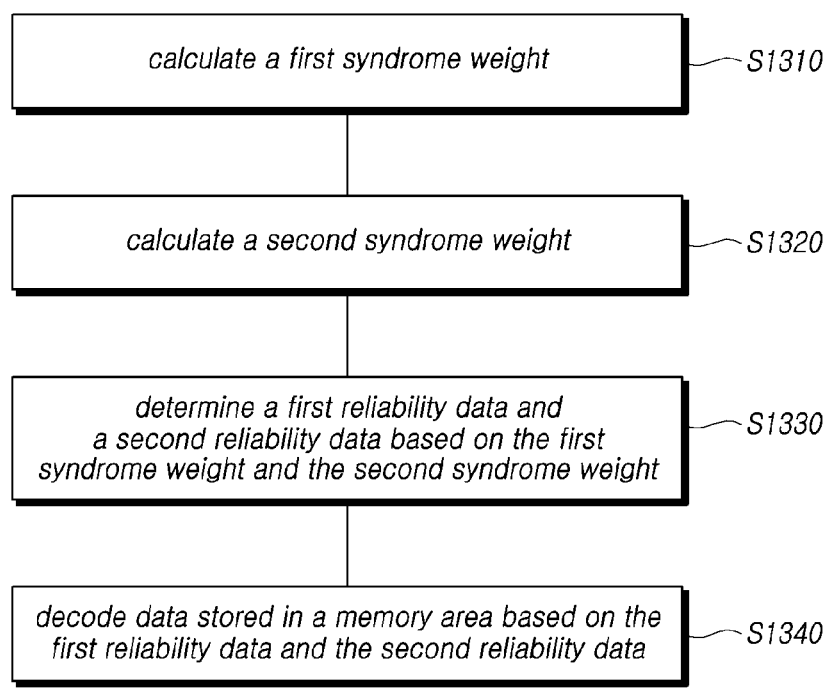
FIG. 13 illustrates an operating method of the controller according to embodiments of the present disclosure.

FIG. 13 illustrates an operating method of the controller 10 according to embodiments of the present disclosure.

Referring to FIG. 13, the operating method of the controller 10 may include calculating a first syndrome weight W_1, which is syndrome weight for first read data RD_1, the first read data RD_1 being hard-decision read data read from a memory area 20 located outside the controller 10 based on a first read bias RB_1 (S1310).

The operating method of the controller 10 may also include calculating a second syndrome weight W_2, which is syndrome weight for second read data RD_2, the second read data RD_2 being hard-decision read data read from the memory area 20 based on a second read bias RB_2 (S1320). The second read data RD_2 may originate in the same memory cell(s) in the memory area 20 as the first read data RD_1.

The operating method of the controller 10 may further include determining the first reliability data L_1 and the second reliability data L_2 based on the first syndrome weight W_1 and the second syndrome weight W_2 (S1330).

For example, the operation S1330 may determine the first reliability data L_1 as being the first read data RD_1 when the first syndrome weight W_1 is less than or equal to the second syndrome weight W_2 and determine the first reliability data L_1 as being the second read data RD_2 when the first syndrome weight W_1 is greater than the second syndrome weight W_2.

As another example, the operation S1330 may determine the second reliability data L_2 as being a result of executing a preset target operation on a first operand OP_1 and a second operand OP_2. When the first syndrome weight W_1 is less than or equal to the second syndrome weight W_2, the first operand OP_1 may be the second read data RD_2 and the second operand OP_2 may be the first read data RD_1. When the first syndrome weight W_1 is greater than the second syndrome weight W_2, the first operand OP_1 may be the first read data RD_1 and the second operand OP_2 may be the second read data RD_2.

Meanwhile, the target operation may be an operation generating a first reliability value when the first operand OP_1 is equal to the second operand OP_2 and generating a second reliability value when the first operand OP_1 is not equal to the second operand OP_2. In this case, the first reliability value may indicate higher reliability than the second reliability value.

And the operating method of the controller 10 may include decoding data stored in the memory area 20 based on the first reliability data L_1 and the second reliability data L_2 (S1340).

Meanwhile, the operating method of the controller 10 may further include calculating a third syndrome weight W_3, which is syndrome weight for third read data RD_3, the third read data RD_3 being hard-decision read data read from the memory area 20 based on a third read bias. The third read data RD_3 may originate in the same memory cell(s) in the memory area 20 as the first and second read data RD_1 and RD_2, and the value of the third read bias may be different than the values of the first and second read biases.

The operating method of the controller 10 may further include maintaining or updating the first reliability data L_1 and the second reliability data L_2 based on the first syndrome weight W_1, the second syndrome weight W_2 and the third syndrome weight W_3.

For example, when the third syndrome weight W_3 is less than or equal to the first syndrome weight W_1 and the second syndrome weight W_2, the maintaining or updating the first reliability data L_1 and the second reliability data L_2 may determine first data D_1 as being the third read data RD_3, determine the first operand OP_1 as being the first reliability data L_1, determine the second operand OP_2 as being the third read data RD_3, determine second data D_2 as being a result of executing the target operation on the first operand OP_1 and the second operand OP_2, update the first reliability data L_1 to be the first data D_1, and update the second reliability data L_2 to be the second data D_2.

As another example, when the third syndrome weight W_3 is less than or equal to a maximum value of the first syndrome weight W_1 and the second syndrome weight W_2 and is greater than a minimum value of the first syndrome weight W_1 and the second syndrome weight W_2, the maintaining or updating the first reliability data L_1 and the second reliability data L_2 may maintain the first reliability data L_1 unchanged, determine the first operand OP_1 as being the third read data RD_3, determine the second operand OP_2 as being the first reliability data L_1, and update the second reliability data L_2 to be a result of executing the target operation on the first operand OP_1 and the second operand OP_2.

As another example, when the third syndrome weight W_3 is greater than the first syndrome weight W_1 and the second syndrome weight W_2, the maintaining or updating the first reliability data L_1 and the second reliability data L_2 may maintain the first reliability data L_1 and the second reliability data L_2 unchanged.

As another example, when the third syndrome weight W_3 is greater than the first syndrome weight W_1 and the second syndrome weight W_2 and difference between the third syndrome weight W_3 and the maximum value of the first syndrome weight W_1 and the second syndrome weight W_2 is less than a preset threshold difference value, the maintaining or updating the first reliability data L_1 and the second reliability data L_2 may maintain the first reliability data L_1 unchanged, determine the first operand OP_1 as being the third read data RD_3, determine the second operand OP_2 as being the first reliability data L_1, and update the second reliability data L_2 to be a result of executing the target operation on the first operand OP_1 and the second operand OP_2.

Figure 14:
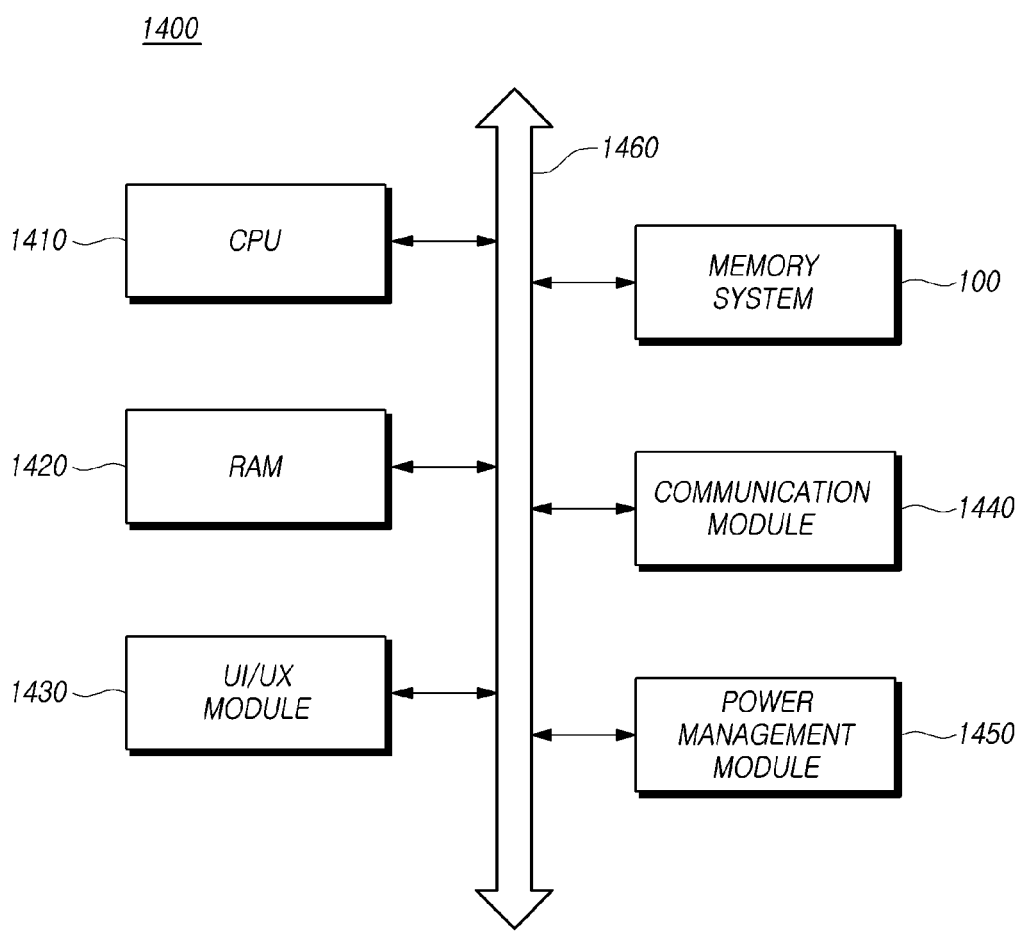
FIG. 14 illustrates a computing system according to embodiments of the disclosed technology.

FIG. 14 is a diagram illustrating the configuration of a computing system 1400 based on an embodiment of the disclosed technology.

Referring to FIG. 14, the computing system 1400 based on an embodiment of the disclosed technology may include: a memory system 100 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device over a wired and/or wireless medium; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A controller comprising:
a storage memory configured to store first reliability data and second reliability data;
a decoder configured to decode data read from a memory area located outside the controller based on the first reliability data and the second reliability data; and
a processing circuit configured to:
calculate a first syndrome weight, wherein the first syndrome weight is syndrome weight for first read data, wherein the first read data is hard-decision read data read from the memory area based on a first read bias;
calculate a second syndrome weight, wherein the second syndrome weight is syndrome weight for second read data, wherein the second read data is hard-decision read data read from the memory area based on a second read bias; and
determine the first reliability data and the second reliability data based on the first syndrome weight and the second syndrome weight,
wherein the processing circuit is configured to:
set the first reliability data to be equal to the first read data based on determination that the first syndrome weight is less than or equal to the second syndrome weight,
set the first reliability data to be equal to the second read data based on determination that the first syndrome weight is greater than the second syndrome weight,
set the second reliability data to be equal to a result of executing a preset target operation on a first operand and a second operand,
set the first operand to be the second read data and the second operand to be equal to the first read data when the first syndrome weight is less than or equal to the second syndrome weight, and
set the first operand to be the first read data and the second operand to be equal to the second read data when the first syndrome weight is greater than the second syndrome weight.

2. The controller of claim 1,
wherein the target operation is an operation generating a first reliability value when the first operand is equal to the second operand and generating a second reliability value when the first operand is not equal to the second operand, and
wherein the first reliability value indicates higher reliability than the second reliability value.

3. The controller of claim 1,
wherein the processing circuit is configured to:
calculate a third syndrome weight, wherein the third syndrome weight is syndrome weight for third read data, wherein the third read data is hard-decision read data read from the memory area based on a third read bias, and
maintain or update the first reliability data and the second reliability data based on the first syndrome weight, the second syndrome weight and the third syndrome weight.

4. The controller of claim 3,
wherein when the third syndrome weight is less than or equal to the first syndrome weight and the second syndrome weight, the processing circuit is configured to:
set first data to be equal to the third read data,
set the first operand to be equal to the first reliability data,
set the second operand to be equal to the third read data,
set second data to be equal to a result of executing the target operation on the first operand and the second operand,
update the first reliability data using the first data, and
update the second reliability data using the second data.

5. The controller of claim 3,
wherein when the third syndrome weight is less than or equal to a maximum value of the first syndrome weight and the second syndrome weight and is greater than a minimum value of the first syndrome weight and the second syndrome weight, the processing circuit is configured to:
maintain the first reliability data unchanged,
set the first operand to be equal to the third read data,
set the second operand to be equal to the first reliability data, and
update the second reliability data using a result of executing the target operation on the first operand and the second operand.

6. The controller of claim 3,
wherein when the third syndrome weight is greater than the first syndrome weight and the second syndrome weight, the processing circuit is configured to:
maintain the first reliability data and the second reliability data unchanged.

7. The controller of claim 3,
wherein when the third syndrome weight is greater than the first syndrome weight and the second syndrome weight and difference between the third syndrome weight and a greater value of the first syndrome weight and the second syndrome weight is less than a preset threshold difference value, the processing circuit is configured to:
maintain the first reliability data unchanged,
set the first operand to be equal to the third read data,
set the second operand to be equal to the first reliability data, and
update the second reliability data using a result of executing the target operation on the first operand and the second operand.

8. An operating method of a controller, the operating method comprising:
calculating a first syndrome weight, wherein the first syndrome weight is syndrome weight for first read data, wherein the first read data is hard-decision read data read from a memory area located outside the controller based on a first read bias;
calculating a second syndrome weight, wherein the second syndrome weight is syndrome weight for second read data, wherein the second read data is hard-decision read data read from the memory area based on a second read bias;
determining a first reliability data and a second reliability data based on the first syndrome weight and the second syndrome weight; and
decoding data stored in the memory area based on the first reliability data and the second reliability data,
wherein determining the first reliability data and the second reliability data comprises:

setting the first reliability data to be equal to the first read data based on determination that the first syndrome weight is less than or equal to the second syndrome weight, setting the first reliability data to be equal to the second read data based on determination that the first syndrome weight is greater than the second syndrome weight, and setting the second reliability data to be equal to a result of executing a preset target operation on a first operand and a second operand, wherein, when the first syndrome weight is less than or equal to the second syndrome weight, the first operand is the second read data and the second operand is the first read data, and wherein, when the first syndrome weight is greater than the second syndrome weight, the first operand is the first read data and the second operand is the second read data.

9. The operating method of claim 8, wherein the target operation is an operation generating a first reliability value when the first operand is equal to the second operand and generating a second reliability value when the first operand is not equal to the second operand, and wherein the first reliability value indicates higher reliability than the second reliability value.

10. The operating method of claim 8, further comprising:

calculating a third syndrome weight, wherein the third syndrome weight is syndrome weight for third read data, wherein the third read data is hard-decision read data read from the memory area based on a third read bias, and maintaining or updating the first reliability data and the second reliability data based on the first syndrome weight, the second syndrome weight and the third syndrome weight.

11. The operating method of claim 10, wherein when the third syndrome weight is less than or equal to the first syndrome weight and the second syndrome weight, maintaining or updating the first reliability data and the second reliability data comprises:

setting first data to be equal to the third read data,
setting the first operand to be equal to the first reliability data,
setting the second operand to be equal to the third read data,
setting second data to be equal to a result of executing the target operation on the first operand and the second operand,
updating the first reliability data using the first data, and
updating the second reliability data using the second data.

12. The operating method of claim 10, wherein when the third syndrome weight is less than or equal to a maximum value of the first syndrome weight and the second syndrome weight and is greater than a minimum value of the first syndrome weight and the second syndrome weight, maintaining or updating the first reliability data and the second reliability data comprises:

maintaining the first reliability data unchanged,
setting the first operand to be equal to the third read data,
setting the second operand to be equal to the first reliability data, and
updating the second reliability data using a result of executing the target operation on the first operand and the second operand.

13. The operating method of claim 10, wherein when the third syndrome weight is greater than the first syndrome weight and the second syndrome weight, maintaining or updating the first reliability data and the second reliability data comprises maintaining the first reliability data and the second reliability data unchanged.

14. The operating method of claim 10, wherein when the third syndrome weight is greater than the first syndrome weight and the second syndrome weight and difference between the third syndrome weight and a maximum value of the first syndrome weight and the second syndrome weight is less than a preset threshold difference value, maintaining or updating the first reliability data and the second reliability data comprises:

maintaining the first reliability data unchanged,
setting the first operand to be equal to the third read data,
setting the second operand to be equal to the first reliability data, and
updating the second reliability data using a result of executing the target operation on the first operand and the second operand.

* * * * *